(No Model.)
W. H. DODGE.
DEVICE FOR TRANSMITTING POWER.
No. 320,544. Patented June 23, 1885.
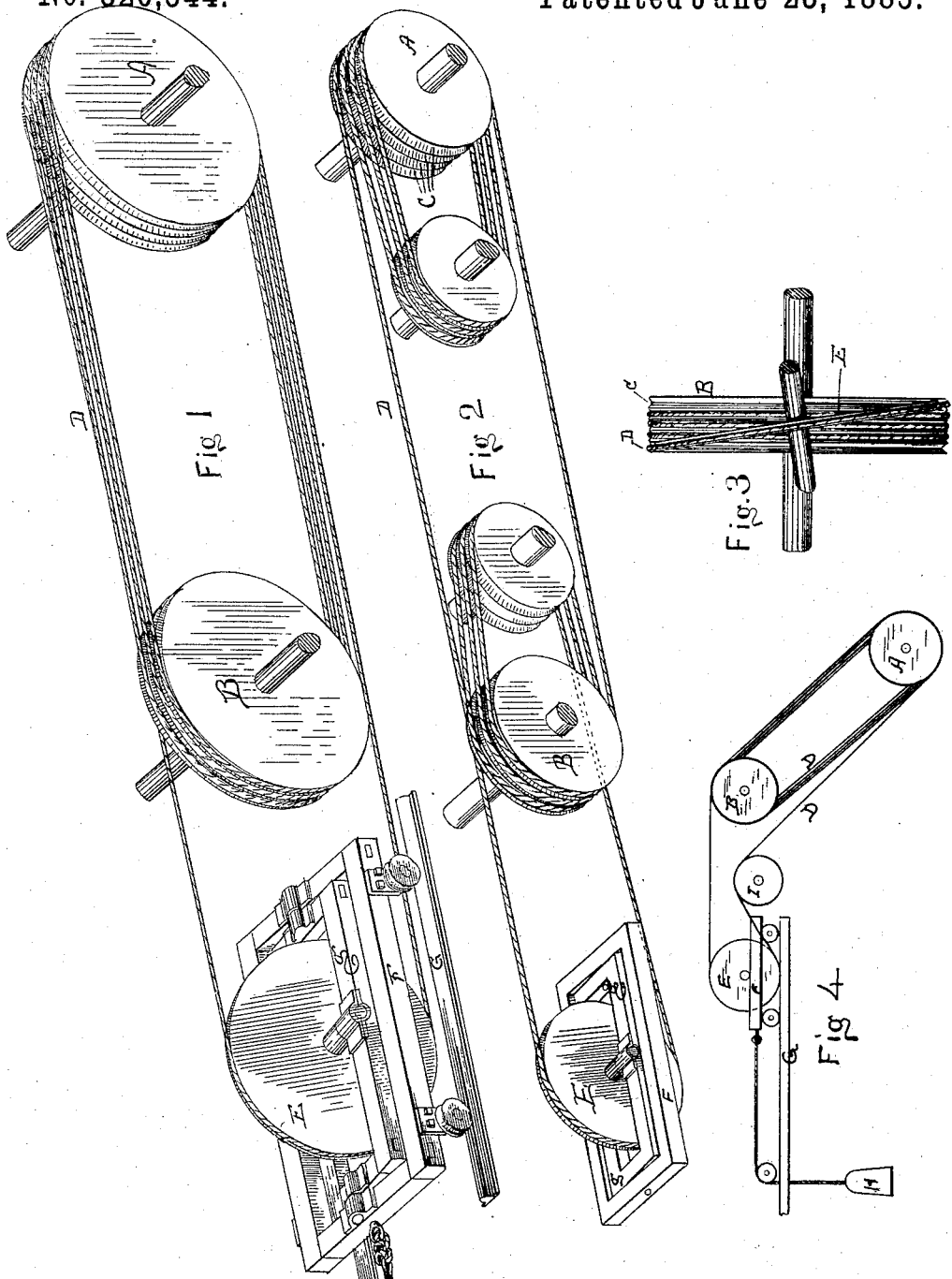
WITNESSES:
INVENTOR
Wallace H Dodge
BY
ATTORNEY

UNITED STATES PATENT OFFICE.

WALLACE H. DODGE, OF MISHAWAKA, INDIANA.

DEVICE FOR TRANSMITTING POWER.

SPECIFICATION forming part of Letters Patent No. 320,544, dated June 23, 1885.

Application filed October 27, 1884. Renewed May 27, 1885. (No model.)

*To all whom it may concern:*

Be it known that I, WALLACE H. DODGE, of Mishawaka, in the county of St. Joseph, in the State of Indiana, have invented a new and useful Improvement in Mechanism for Transmitting Power; and I do hereby declare that the following is a full and accurate description of the same.

It is a well-known fact in mechanical engineering that in transmitting power by flat belts it is impossible to utilize more than a small part of the strength of the belt, because it is impossible to obtain sufficient adhesion to the pulley to enable it to transmit to the belt as much power as its strength would warrant. Therefore the necessary adhesion is obtained by increasing the width of the belt. It is also known that the power transmitted by a specified belt is as its velocity. It is also known that flat belts running at a high speed carry air under them, which decreases both the angle and area of contact with the pulley and correspondingly diminishes the transmitting-power. My invention obviates these losses due to the use of belts, as heretofore practiced, by the employment of round belts, preferably of rope, with multiple turns around the pulleys for adhesion, and, if desired, multiple passage from driver to driven of a continuous rope for increased transmitting-power, and an automatic slack taken, whereby the rope is properly led and a uniform tension maintained. The round or cylindrical belt encounters less atmospheric friction than a flat belt of equal strength, and does not suffer loss of adhesion by reason of lubricating air carried between it and the pulley.

I am aware that round belts of rope and other material have been heretofore employed, and that such belts have been passed several times from drivers to driven pulley, and that the belt has been led from the last groove of the driver by means of an inclined leading-pulley mounted on pivoted arms, and that the same end has been attained by the use of smooth-faced pulleys, and grooved leading rollers in close contact therewith, whereby the rope-belt is caused to maintain its position on the face of the pulley. These methods are, however, practically defective, because in practice the rope will vary greatly in length from day to day from atmospheric causes, and it is therefore necessary to provide a slack-taking device having a long range of action—a rectilinear movement, so that the relative positions shall be varied. So far as I know these qualities are not found in any device of this character.

That others may fully understand my invention, I will particularly describe it, having reference to the accompanying drawings, in which—

Figure 1 is a perspective view of my invention. Fig. 2 is a perspective, showing a modification. Fig. 3 is a transverse elevation, showing the position of the leading-wheel. Fig. 4 represents a modification.

A is the driver, to which motion is transmitted from some convenient prime mover. The driver A may be moved directly by the prime mover or by means of intermediate devices, as desired. B is the driven pulley, by which the transmitted power is distributed to the mechanisms to be impelled. It will be understood that the pulleys A and B are two ends of a transmitting system, and that the sources and final destination of the power are not contemplated here.

I prefer to make one or more V-shaped grooves, C, in the faces of the pulleys A B to receive the rope-belt D, which may pass back and forth around said pulleys more than once, if desired. The effect of passing the rope back and forth continuously several times is to duplicate the effective belt and to enable it to transmit two or three times the power of one, as the case may be; but to enable the performance to be uniform a uniform tension or pressure upon the pulleys must be maintained, and I therefore pass the slack part of the belt D over an idler or slack-taking pulley, E, which I mount upon a carriage, F, which is capable of rectilinear motion, impelled by a pressure, for which purpose the constant gravity of a suspended weight is on every account preferable.

In practice I prefer to mount the pulley E upon a wheeled carrriage, F, which runs upon a suitable track, G, being provided with wheels for its easy transportation. A weight, H, is attached to the carriage F by means of a chain or rope; and the rope D is thereby subjected to a constant and unvarying strain, whether it be elongated by natural stretching or alternately elongated and shortened by reason of hygrometric changes.

I prefer to construct the carriage E with an inside frame, g, connected at its ends to the carriage-frame F by pivot-bolts, so that said frame g may be adjusted and set at any desired angle to the outer frame, F. The idler E is mounted in this frame g, with the axis of its axle transverse to the longitudinal axis of motion of said frame g; and the wheel E may be set oblique to the plane of the wheels A B, so that the rope D in passing over the wheel E will be led properly from one outside groove of the driver back to the other outside groove, as set forth.

By means of guide-pulleys like I, disposed as desired, the direction of the rope D between the pulleys A B and idler E may be changed, so that, whatever may be the angular positions of said pulleys A B as to the pulley E, the movement of the latter will be in a constant line and the uniformity of the tension will be maintained.

Having described my invention, I claim—

1. The pulleys A B, each provided with one or more peripheral grooves, C, the endless belt or rope D, combined with a wheel, E, a carriage, F, for said wheel, and a rectilinear track or guideway, G, for the same, said carriage being impelled away from said pulleys by a constantly-acting force, substantially as set forth.

2. The pulleys A B, the rope D, placed thereon, and the idler E, combined with the carriage F g, adjustable to vary the angular position of the wheel E to adapt it to the number of grooves employed on the pulleys A B, and a yielding device to impel said carriage and idler E away from said pulleys A B and keep said rope D always taut.

3. The combination of the pulleys A B, the rope D, placed thereon, the idler E, mounted upon the carriage F, adapted to move only in a right line, a track or guideway, G, and an impelling weight attached to said carriage.

4. The pulleys A B, rope D, placed thereon, the inclined idler E, mounted upon a carriage, F, impelled by gravity, and a rectilinear track or guideway, G, for said carriage, combined with one or more guide-pulleys, I, whereby the angular position of the carriage F and track G as to the pulleys A B may be changed, as desired.

WALLACE H. DODGE.

In presence of—
  R. D. O. SMITH,
  J. C. TURNER.